US012644543B2

(12) United States Patent
Dorschner

(10) Patent No.: US 12,644,543 B2
(45) Date of Patent: Jun. 2, 2026

(54) CLAMP RING FOR FASTENING PIPES

(71) Applicant: Illinois Tool Works Inc., Glenview, IL (US)

(72) Inventor: Stéphane Dorschner, Weiterswiller (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/737,282

(22) Filed: Jun. 7, 2024

(65) Prior Publication Data

US 2024/0410503 A1    Dec. 12, 2024

(30) Foreign Application Priority Data

| | | |
|---|---|---|
| Jun. 8, 2023 | (FR) | 2305803 |
| Oct. 18, 2023 | (FR) | 2311244 |
| May 22, 2024 | (EP) | 24315242 |

(51) Int. Cl.
   F16L 23/06 (2006.01)
   F16L 19/06 (2006.01)

(52) U.S. Cl.
   CPC .................................... F16L 19/06 (2013.01)

(58) Field of Classification Search
   CPC ....... F16L 3/1075; F16L 19/06; F16L 19/065; F16L 21/06; F16L 17/04; F16L 23/04; F16L 23/06; F16L 23/08; F16L 23/10; F16L 25/06; F16L 55/1705; F16L 55/171; F16L 55/172; F16L 55/1725; F16L 33/04; F16L 33/06; F16L 33/12; F16L 33/10
   See application file for complete search history.

(56) References Cited

U.S. PATENT DOCUMENTS

| | | | |
|---|---|---|---|
| 4,381,585 A | 5/1983 | Morel | |
| 4,678,216 A * | 7/1987 | Gregory | F16L 23/06 |
| | | | 292/256.69 |
| 6,964,425 B2 * | 11/2005 | Turner | F16F 9/54 |
| | | | 280/279 |

FOREIGN PATENT DOCUMENTS

| | | |
|---|---|---|
| CN | 111750189 A | 10/2020 |
| CN | 213655994 U | 7/2021 |
| CN | 215568443 U | 1/2022 |
| EP | 3851725 B1 | 10/2022 |
| EP | 4244513 A1 | 9/2023 |
| FR | 3062689 B1 | 2/2020 |

OTHER PUBLICATIONS

European Office Communication with executed search report Appln No. 24315242.8 dated Oct. 4, 2024.

* cited by examiner

*Primary Examiner* — Aaron M Dunwoody
(74) *Attorney, Agent, or Firm* — McAndrews, Held & Malloy, Ltd.

(57) ABSTRACT

Disclosed clamp rings for fastening a pipe, the clamp ring comprising a strap, a lever and a clip. The strap is attached to the lever, and the lever is attached to the clip, the clip being arranged to grip the strap, and, with the lever gripping the strap, the lever being arranged to push the opposite ends of the strap towards each other. The clamp ring is made in a single piece, the strap, the lever and the clip being connected to each other by breakaway connectors that break when the strap, the lever and the clip are moved relative to each other.

17 Claims, 8 Drawing Sheets

[Fig. 1]
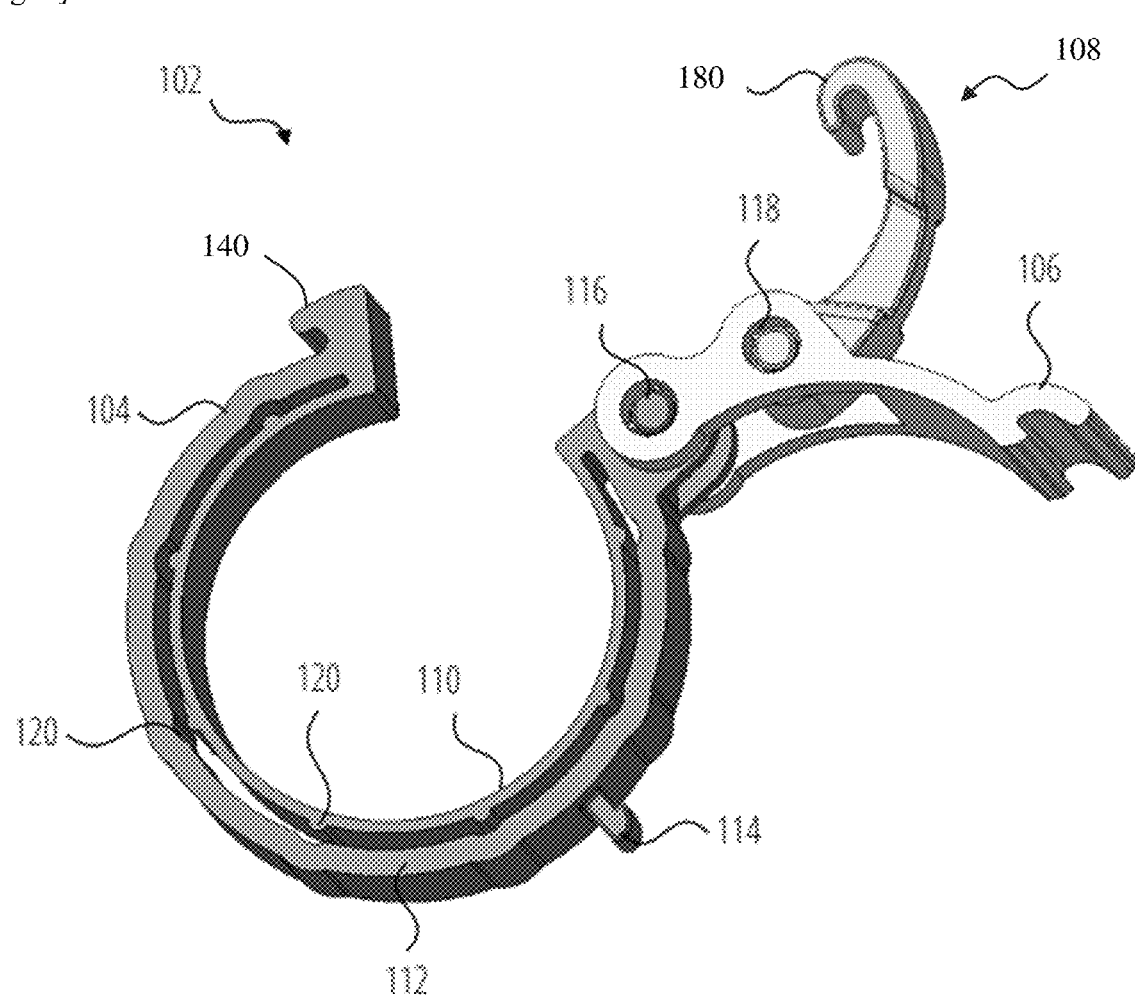

[Fig. 2]
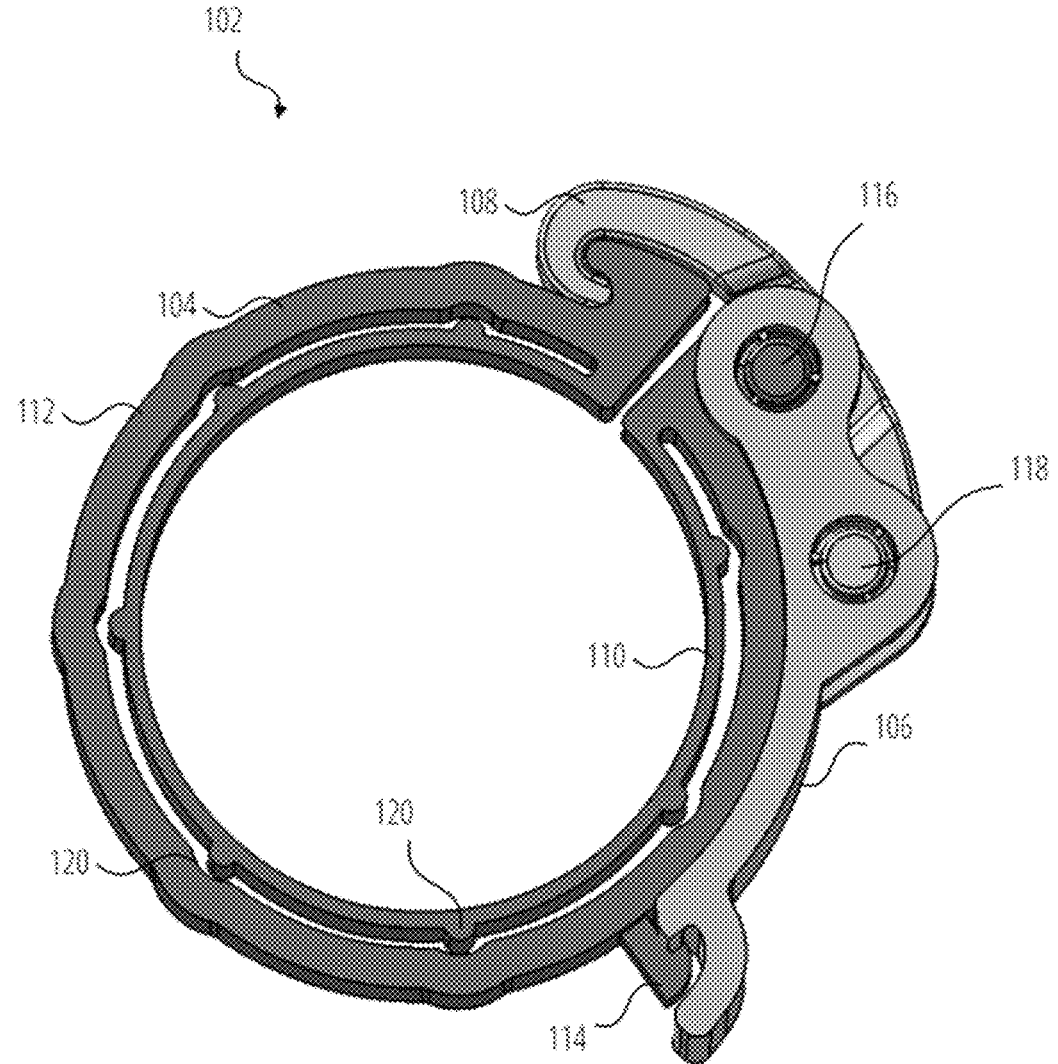

[Fig. 3]
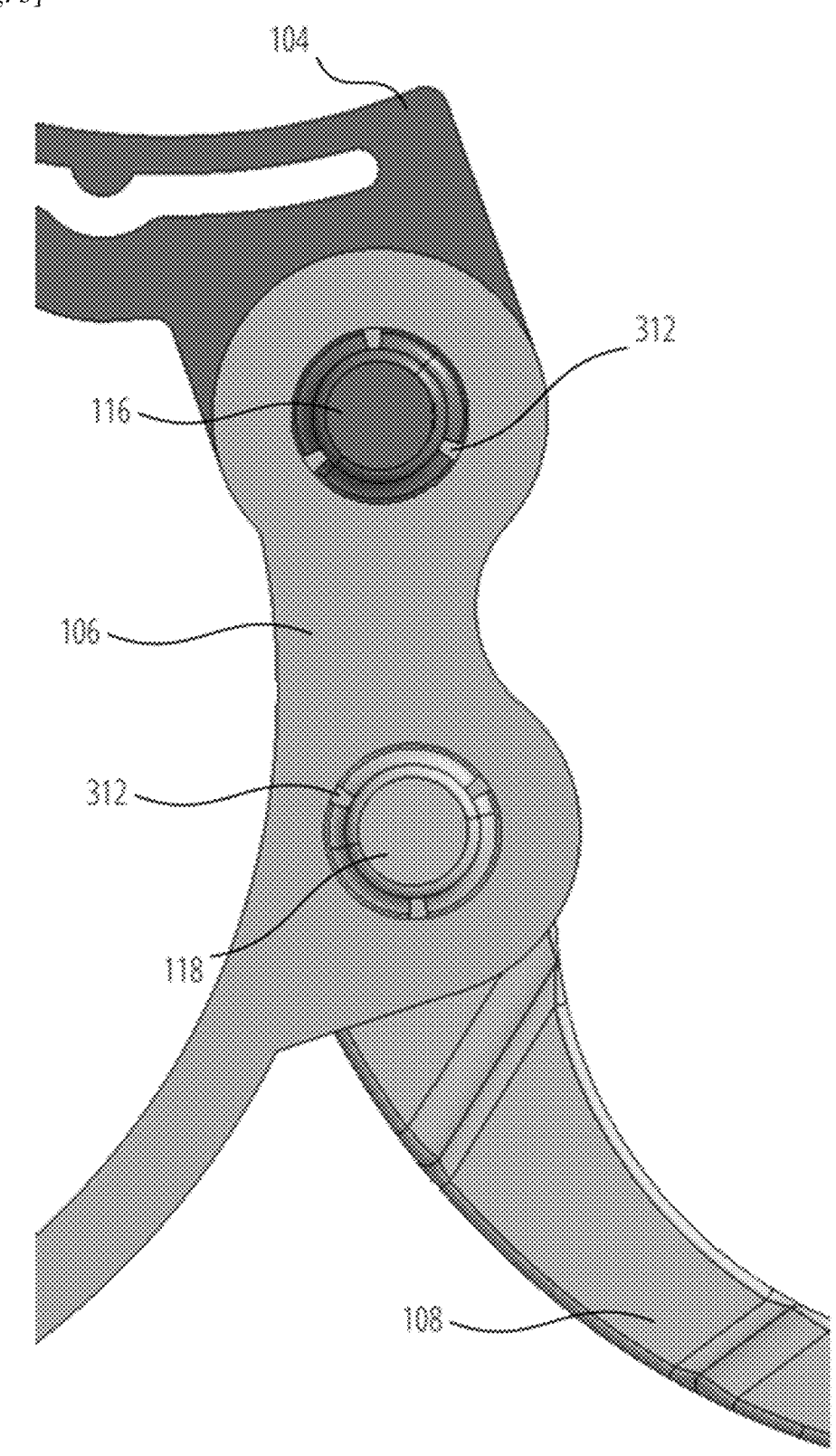

[Fig. 4]
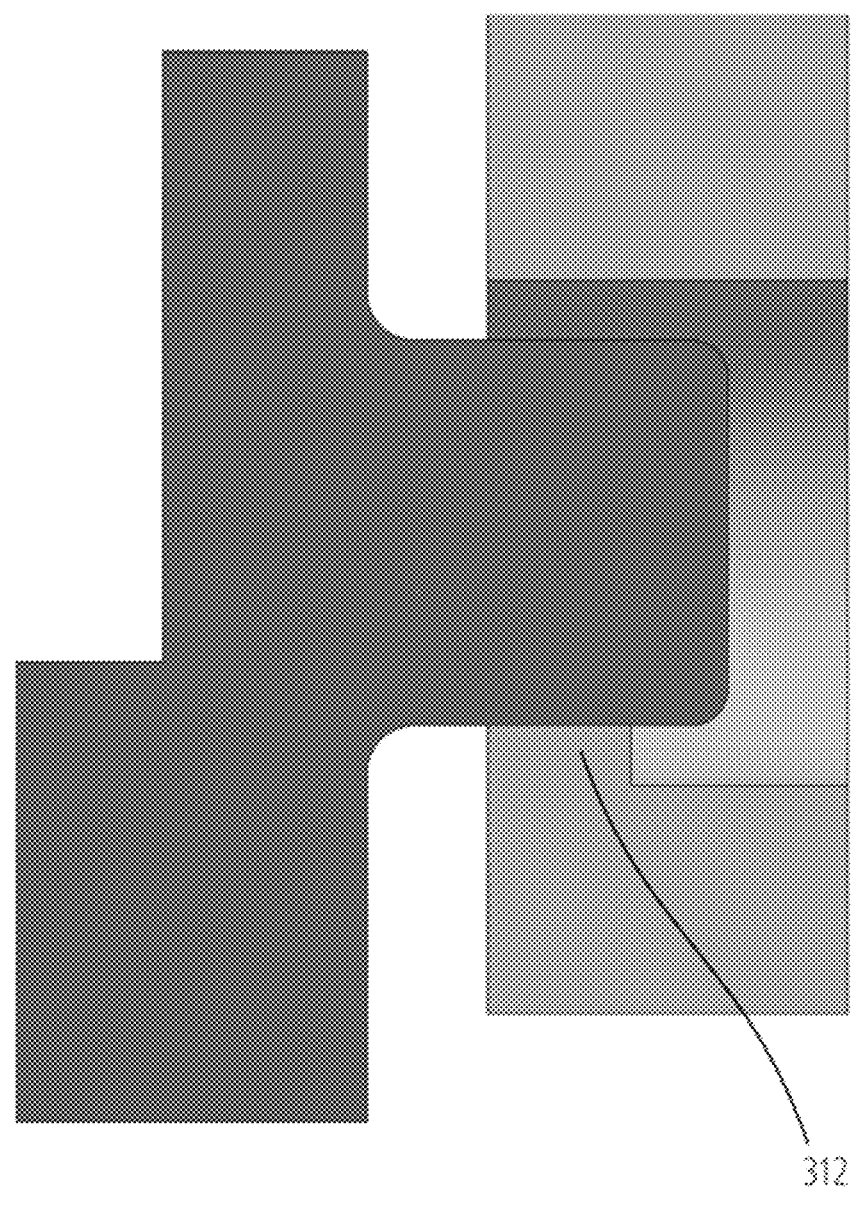
312

[Fig. 5]

[Fig. 6]
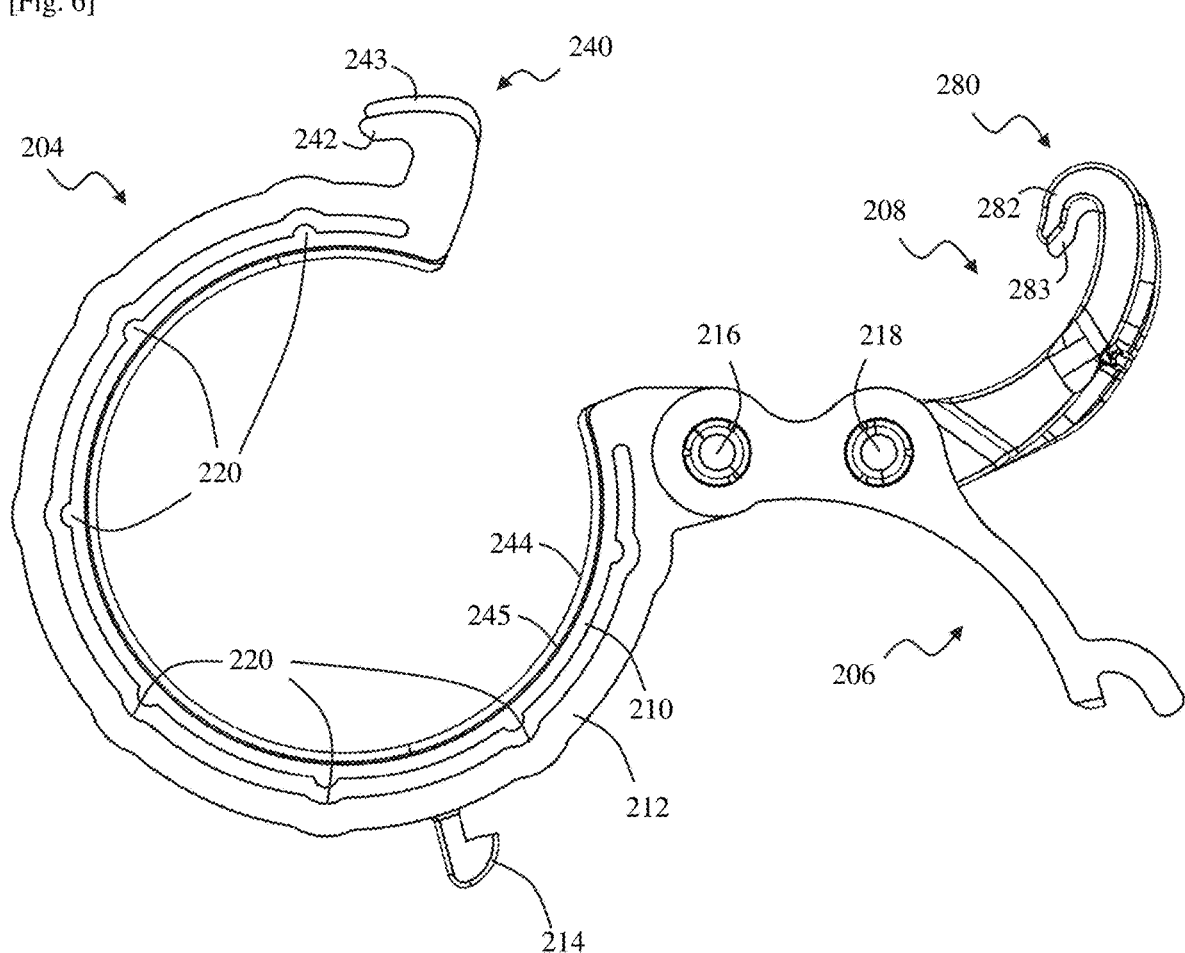

[Fig. 7]
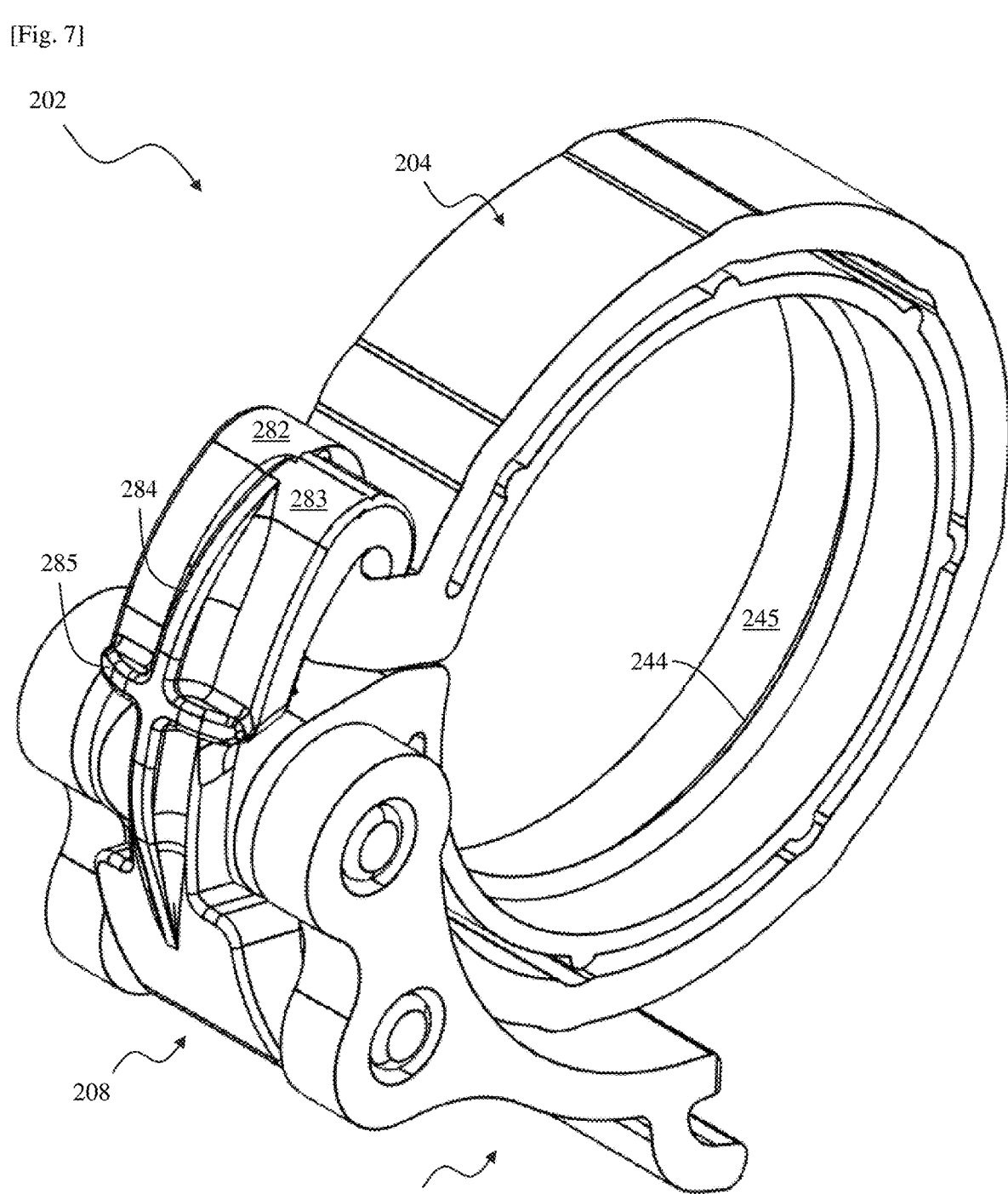

[Fig. 8]
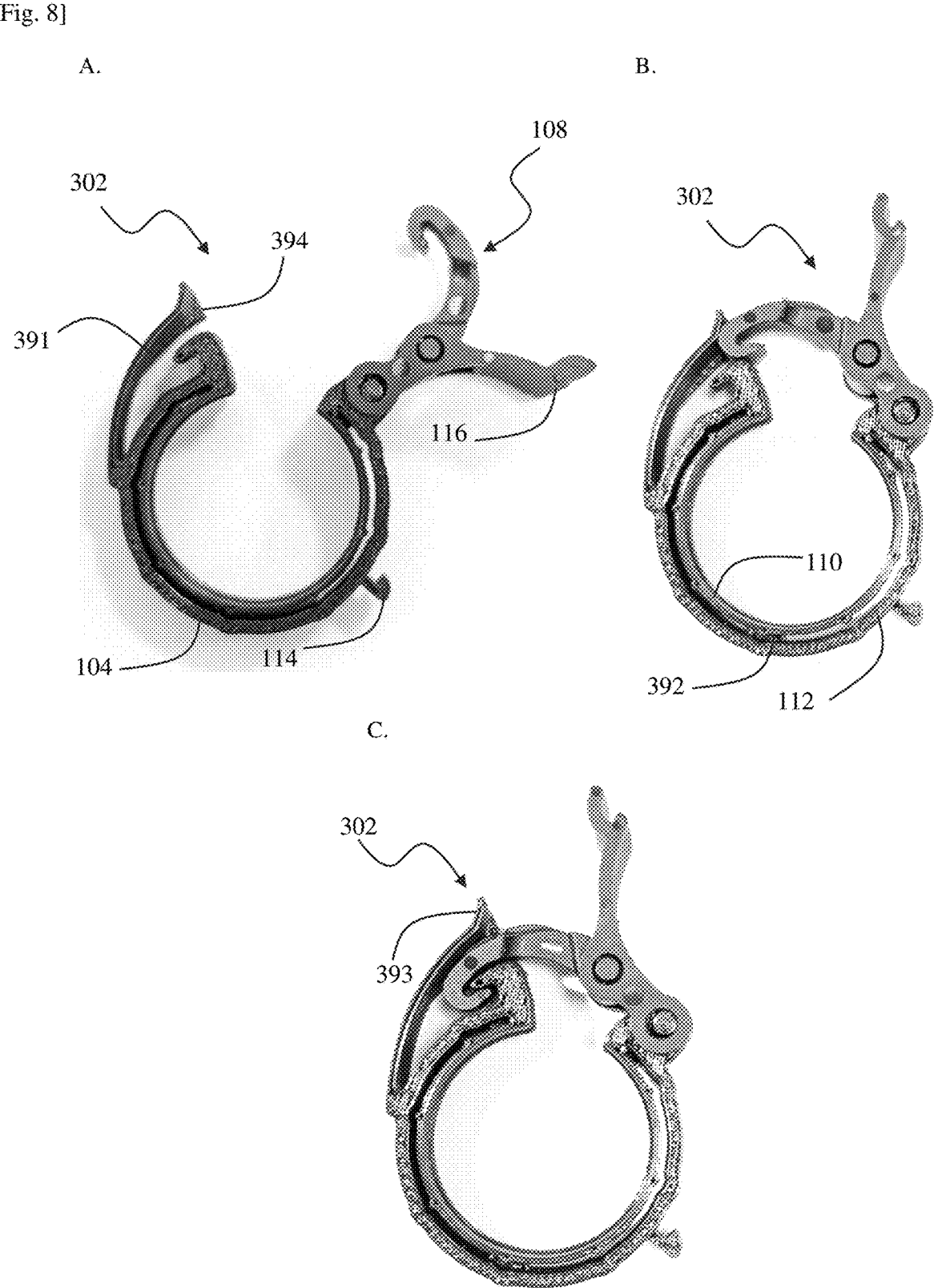

CLAMP RING FOR FASTENING PIPES

RELATED APPLICATIONS

The present application claims the benefit of French (FR) Patent Application No. 2,305,803, filed Jun. 8, 2023, to French (FR) Patent Application No. 2,311,244, filed Oct. 18, 2023, and to European (EP) Patent Application No. 2431 5242.8, filed May 22, 2024. The entireties of French (FR) Patent Application No. 2,305,803, French (FR) Patent Application No. 2,311,244, and European (EP) Patent Application No. 2431 5242.8 are expressly incorporated herein by reference.

TECHNICAL FIELD

The present disclosure relates to a clamp ring for fastening a pipe.

BACKGROUND

Heating, ventilation and air-conditioning systems require the interconnection of multiple pipes. This can be time-consuming and difficult, as such systems are normally installed in confined spaces.

Another problem arises when the pipes are not perfectly cylindrical or manufacturing tolerances are broad, which results in minor variations that an installer needs to take into account.

Pipe fasteners can be complex, multi-part fittings that are challenging to handle. A system can require a large number of such fasteners, which are costly to manufacture due to their multiple separate parts.

BRIEF SUMMARY

According to a first aspect of the present disclosure, a clamp ring for fastening a pipe is provided, the clamp ring comprising a strap, a lever, and a clip, in which the strap is attached to the lever, and the lever is attached to the clip, the clip being arranged to grip the strap, and, with the lever gripping the strap, the lever being arranged to push opposite ends of the strap towards each other; in which the clamp ring is made from a single piece, the strap, lever and clip being connected to each other by breakaway connectors that break when the strap, lever and clip are moved relative to each other. Making the pipe fastener from a single piece considerably reduces production costs, since multiple separate processes are made redundant. Moreover, there is no risk of the parts of the pipe fastener coming apart in transit and time is saved since a user of the fastener does not need to assemble the pipe fastener or prepare it for use. Appropriately, the strap comprises an inner strand and an outer strand connected at opposite ends, the outer strand being longer than the inner strand. The provision of multiple strands enables the clamp ring to accommodate varying pipe diameters. As the inner strand is shorter, it can adapt to pipes with circumferences that are relatively smaller than the ones that can be accommodated by the outer strand.

The inner strand can distend, stretch or otherwise deform to adapt to pipes with larger circumferences, up to pipes with circumferences that match the length of the outer strand.

Preferably, the inner strand and/or the outer strand comprise one or more notches between the inner strand and the outer strand. The notches can be convex or concave. Matching notches can be arranged on each of the outer strand and inner strand. A concave notch can be paired with a convex notch. The notches provide additional material between the strands, so that if a pipe with a circumference smaller than the length of the outer strand is placed in the clamp ring, and the clamp ring is placed in a closed position, the notches of one strand come into contact with the opposite strand or opposite notches, which enables the opposite strands to provide additional structural support and to avoid part redundancy.

Preferentially, at least one notch in the clamp ring is convex.

Preferentially, at least one notch in the clamp ring is concave.

Preferentially, at least one matching notch is arranged on each of the outer strand and inner strand.

Preferentially, at least one concave notch is paired with at least one convex notch.

Appropriately, the strap comprises a latch arranged to stop the lever from moving, when the clamp ring is placed in a closed position. When the clamp ring is in the closed position, the locking movement of the lever is advantageous to prevent the clamp ring from being accidentally opened by impacts or vibrations.

Preferably, a first breakaway connector is provided at a first pivot point between the strap and the lever, and a second breakaway connector is provided at a second pivot point between the lever and the clip.

If a user must, of necessity, rotate the lever, clip and straps around the pivot points to adjust the clamp ring, this arrangement of the breakaway connectors ensures that no additional operation by the user is required to break the breakaway connectors.

Preferentially, the clip comprises a hook designed to engage with a hook on the strap to grip the strap.

Preferentially, the clip hook and the strap hook each comprise a radial or circumferential pitch to inhibit lateral movement between the clip and the strap.

Preferentially, the clip hook and the strap hook each comprise a pair of hook portions that are radially and/or circumferentially displaced from one another, so as to provide the radial or circumferential pitch.

Preferentially, the clip hook comprises a reinforcement ridge along at least part of its length.

Preferentially, the clip hook comprises a lateral reinforcement ridge perpendicular to the reinforcement ridge over at least part of its length.

Preferentially, the strap comprises a ridge protruding from its inner surface over at least part of its length to engage onto the outer surface of a pipe to which the clamp ring is fastened.

Appropriately, the strap comprises a tongue arranged to guide and/or hold the clip and optionally wherein the tongue comprises a guide wall and further optionally or alternatively, the tongue comprises a ramp.

Preferentially, the strap comprises one or more links connecting the inner strand to the outer strand.

BRIEF DESCRIPTION OF THE DRAWINGS

Aspects of the disclosure will now be described, by way of example only, with reference to the accompanying drawings.

FIG. 1 illustrates a clamp ring according to at least one aspect of the disclosure, in the open position;

FIG. 2 illustrates a clamp ring according to at least one aspect of the disclosure, in the closed position;

FIG. 3 shows a close-up view of a part in a clamp ring according to at least one aspect of the disclosure;

FIG. 4 shows a cross-section of a clamp ring according to at least one aspect of the disclosure;

FIG. 5 shows a clamp ring according to at least one aspect of the disclosure, in the open position;

FIG. 6 shows a clamp ring according to at least one aspect of the disclosure, in the open position;

FIG. 7 illustrates a clamp ring according to at least one aspect of the disclosure, in the closed position; and FIG. 8 shows A. a clamp ring according to at least one aspect of the disclosure, in the open position, B. a clamp ring according to at least one aspect of the disclosure, in a semi-closed position, and C. a clamp ring according to at least one aspect of the disclosure, in the closed position.

DETAILED DESCRIPTION

A number of terms are used in the following description, for convenience and without being limiting. The words "right", "left", "lower", "upper", "front", "rear", "upwards", "down" and "downwards" refer to directions on the drawings to which reference is made and relate to the component described when assembled and mounted. The words "inner", "inward", "outer" and "outward" refer to directions towards and away from, respectively, a designated centerline or a geometric center of an element being described (for example the central axis), the specific meaning being readily apparent from the context of the description.

Additionally, as used herein, the terms "connected", "attached", "coupled" and "mounted" are intended to include direct connections between two elements without the interposition of other elements between them, as well as indirect connections between elements in which one or more other elements are interposed between them. This terminology includes the words specifically mentioned above, their derivatives, and words with a similar meaning.

Additionally, unless otherwise specified, the use of ordinal adjectives, such as "first", "second" and "third" etc., merely indicates that reference is being made to different instances of similar objects without implying that the objects so described must be in a given sequence, in time, in space, in a ranking or in any other way.

Identical reference numbers are used to represent identical features throughout the document.

A part enabling a tube or a pipe with pressure distributed over the entire circumference to be secured.

The part enables a tube or a pipe with pressure distributed over the entire circumference to be secured. The part consists of a retaining piece that comprises a strap, a tensioning lever piece and a clip piece. These three components are injected in a single operation, using small connectors that can be broken off when locked onto the tube to be secured. This tensioning lever device enables high clamping force to be achieved due to the movements between the various components around their rotational axes. The retaining portion can accommodate several notches to adjust the clamping force. The strap portion, in contact with the tube to be secured, offers the advantage of being flexible and of conforming to the shape of a tube that may be slightly deformed. A small locking clip attached to the retaining portion prevents accidental opening of the tensioning lever. Exemplary application: heating, ventilation and/or air-conditioning systems for motor vehicles.

FIG. 1 shows a perspective view of a clamp ring 102 in the open position. The clamp ring 102 comprises a strap 104, a lever 106 and a clip 108 that are connected to each other. The strap 104 is connected to the lever 106 via a first pivot point 116. The lever 106 is then itself connected to the clip 108 by a second pivot point 118. The strap 104, the lever 106 and the clip 108 can rotate relative to each other around the first pivot point 116 and the second pivot point 118.

One or both of the first pivot point 116 and the second pivot point 118 can be provided with supporting areas, meaning an additional body of material, which is arranged to come into contact with the lever 106 when the clip 102 is moved from an open position to a closed position.

The strap 104 is made of an inner strand 110 and of an outer strand 112, connected at respective ends. The strap 104 has a substantially open circular shape. Due to its substantially circular shape, the outer strand 112 is necessarily longer than the inner strand 110, with both strands generally taking a circular path. The circular path taken by the inner strand 110 is smaller in diameter than the circular path taken by the outer strand 112.

The strap 104 (and accordingly the inner strand 110 and the outer strand 112) is made of an elastic material, such as metal or plastic, and is capable of bending or deforming to bring respective ends from a separated position to a relatively close position, forming a closed circle.

The strap 104 further comprises a latch 114, shown located on the outer strand 112, although obviously other suitable locations are possible for a latch 114 on the clamp ring 102. The purpose of the latch is to stop the movement of the lever 106 when the clamp ring 102 is in the closed position, so the latch 114 can be placed anywhere on the clamp ring 102 that enables this function to be achieved.

The inner strand 110 and the outer strand 112 comprise notches 120. The notches 120 are arranged on opposite sides of the inner strand 110 and of the outer strand 112 so that the notches 120 of one strand interfere or otherwise interact with the other strand, or the notches 120 of the other strand. These notches enable both strands to provide a support function, regardless of whether or not the pipe inserted into the clamp ring 102 has a circumference comparable to the outer strand 112.

Preferably, at least the inner strand 110 is capable of distending or otherwise deforming to accommodate a range of pipe circumferences, which enables the clamp ring 102 to couple effectively to a pipe with a reduced manufacturing tolerance or to a deformed pipe.

The clip 108 is provided with gripping means, such as a hook, with which it can grip one end of the strap 104, for example via a matching recess, so that the clip 108 can push, under the action of the lever 106, one end of the strap 104 towards the other end. In this example, the clip 108 comprises a hook 180 designed to engage with a hook 140 on the strap 104 to grip the strap 104.

The lever 106 is arranged between the clip 108 and the strap 104, connecting and joining the parts, via a first pivot point 116 and a second pivot point 118. The lever 106 provides a means, via the clip 108, of pushing the ends of the strap 104 together and placing the clamp ring 102 in the closed position.

Once in the closed position, the lever can be stopped by the latch 114. The latch 114 can be reversible, with one example consisting of providing a ratchet on the outer strand 112 and a matching tooth on the lever 106, as shown in FIG. 1. The latch 114 can be released by releasing the ratchet tooth, and the clamp ring 102 can be returned to the open position, thus enabling the maintenance of a pipe connected using the clamp ring 102.

FIG. 2 shows the clamp ring 102 in FIG. 1 in the closed position. The clip 108 grips the strap 104 and the respective ends of the strap 104 are pulled alongside each other so that the strap 104 forms a generally closed circle. The lever 106 is placed in a locked position with the latch 114 engaged.

FIG. 3 is a close-up view of the first pivot point 116 and of the second pivot point 118 located between the strap 104, the lever 106 and the clip 108 on the clamp ring 102. Breakaway connectors 312 are present between the strap 104, the lever 106 and the clip 108 at the first pivot point 116 and the second pivot point 118. Such breakaway connectors 312 allow the clamp ring 102 to be made in a single manufacturing step, for example by casting or injection molding. The breakaway connectors 312 form a passage through which the material can flow from one part to the other, ensuring the formation of a complete clamp ring 102 during the single manufacturing step.

It is understood that more than one breakaway connector 312 can be provided between each point, even if the number of breakaway connectors 312 is limited by the need for a user to be able to manually break the breakaway connectors 312. Too many breakaway connectors 312 can prevent a user from being able to operate the clamp ring 102 or require a tool, which would impair its ease of use and/or the speed with which it can be operated. Three breakaway connectors 312 are shown in FIG. 3 at each pivot point by way of example.

To make them easier to break, the breakaway connectors 312 can comprise a tapered section, comprising less material, which makes them easier to break.

It is understood that the breakaway connectors 312 can be located at any point between the strap 104, the lever 106 and the clip 108, provided that the breakaway connectors 312 can perform their function as a channel through which material can flow, enabling the formation of a complete clamp ring 102 in a single manufacturing step.

In FIG. 3, the breakaway connectors 312 are shown at the first pivot point 116 and the second pivot point 118, since a user has to rotate these parts relative to each other during normal use of the clamp ring 102, which means that no special action, rotation or manipulation is required by the user to break the breakaway connectors 312.

FIG. 4 shows a cross-section through a pivot point of the clamp ring 102. The parts can be either the lever 106 and the strap 104 or the lever 106 and the clip 108. This is irrelevant, as the function described herein will be the same for all parts.

A breakaway connector 312 is shown in cross-section spanning the gap between the parts of the clamp ring 102 at the first pivot point 116.

To make it easier to break the breakaway connector 312, the thickness of the breakaway connector 312 is reduced compared to the thickness of the parts to which it is connected.

Figure 5:
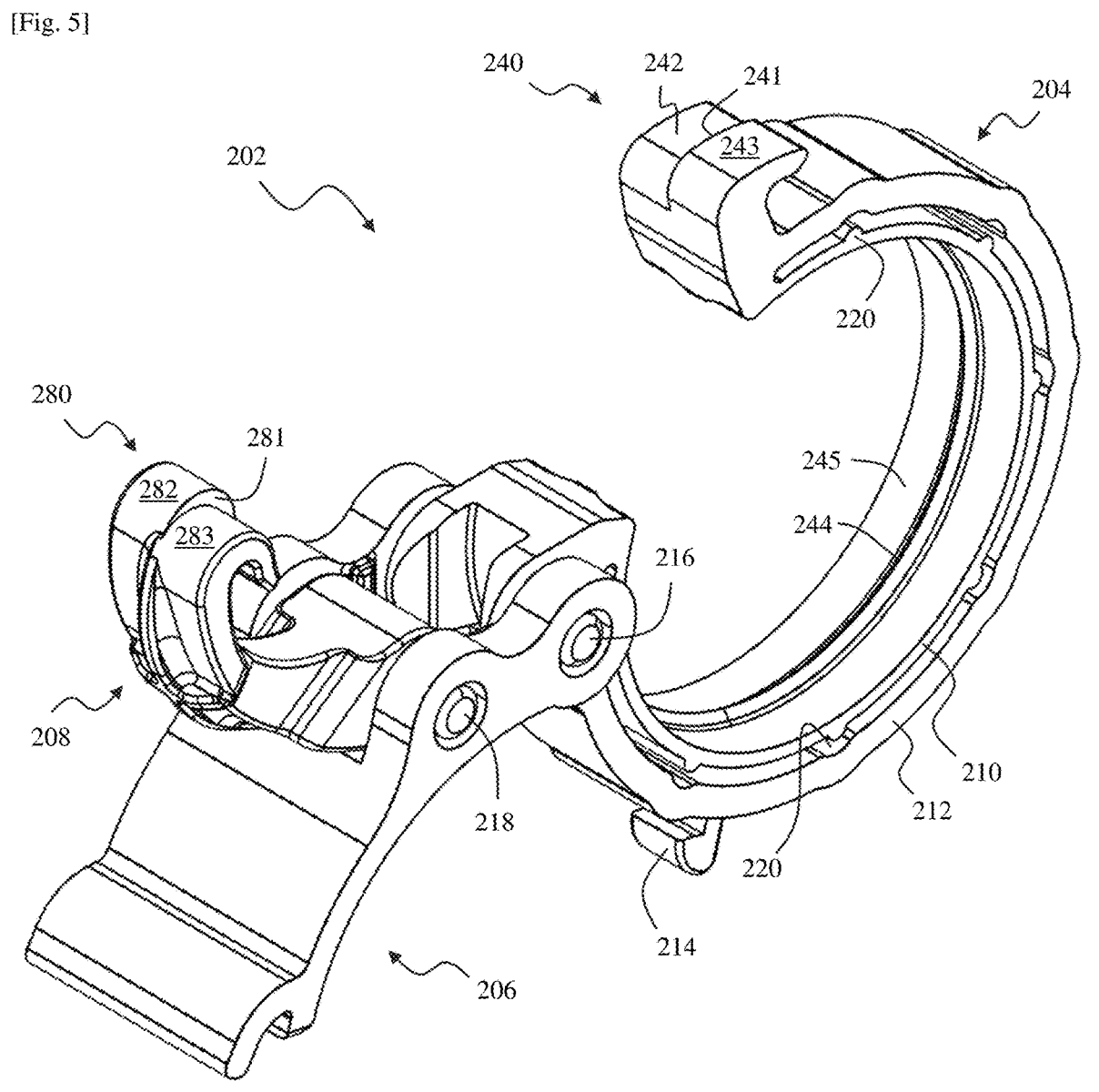

FIGS. 5 to 7 show a clamp ring 202 according to another example similar to the clamp ring 102 in FIGS. 1 to 4, where similar references represent similar features, incremented by 100. The clamp ring 202 according to this example differs from the one in FIGS. 1 to 4 in that the hook 280 of the clip 208 and the hook 240 of the strap 204 each comprise a radial or circumferential pitch 281, 241 to inhibit lateral movement between the clip 208 and the strap 204.

More specifically, the hook 280 of the clip 208 and the hook 240 of the strap 204 each comprise a pair of hook portions 282, 283, 242, 243 displaced radially and/or circumferentially relative to each other, so as to provide the radial or circumferential pitch 281, 241.

In this example, the hook 280 of the clip 108 also comprises a reinforcement ridge 284 over at least part of its length and a lateral reinforcement ridge 285 perpendicular to the reinforcement ridge 284 over at least part of its length.

The strap 204 also comprises a ridge 244 protruding from its inner surface 245 over at least part of its length to engage onto the outer surface of a pipe to which the clamp ring is fastened.

The lever 206 also comprises inner ridges to reduce gaps and lateral movements while the clamp ring 202 is being closed and when it is closed. It makes the whole part more stable.

FIG. 8 shows a clamp ring 302 according to another example similar to the clamp rings 102 and 202 in FIGS. 1 to 7, where similar references represent similar features. The clamp ring 302 further comprises a tongue 391 attached to the outer strand 112 and arranged such that a tip of the tongue 391 is adjacent the strap hook 140. The purposes of the tongue 391 are to act as a guide for the clip 108, to ensure the clip correctly travels towards and engages with the strap hook 140, and also to hold the clip 108 in connection with the strap hook 140, for example, when the clamp ring 302, is in transit, thereby maintaining the clamp ring 302 in a semi-closed position. Where the tongue 391 is present the breakaway connectors 312 may be omitted.

In this way the tongue 391 means that the clamp ring 302 may be fitted single-handedly as the tongue 391 guides the clip 108 into correct placement. This effect is further enhanced by providing an optional side wall 394 or walls to the tongue to ensure correct lateral positioning of the clip 108 and/or an optional ramp 393 to ensure the tongue 391 captures the clip 108 easily. Here "lateral" means movement in a direction substantially perpendicular, or at least not parallel with a direction of intended movement of the clip 108 (i.e. towards and away from the strap hook 104).

The tongue 391 is formed of resilient material, such that once the clip 108 is captured by the tongue 391, the clip is urged by the tongue towards the clamp ring 302.

One or more links 392 are also optionally added between the outer stand 112 and inner strand 119. The links connect the strands at locations intermediate connected ends (see discussion above) in order to improve the rigidity of the whole clamp ring 302. Increased rigidity helps both with the assembly and the holding of the collar by an end user. The one or more links 392 can also prevent plastic deformation of the clamp ring 302 when placing the clamp ring 302 in a closed position.

The person skilled in the art will note that the examples detailed above have been described by way of example only and are in no way limiting, and that various variations and changes are possible without departing from the scope of the disclosure. Various changes can be made to the detailed examples described above.

In the description and claims in this specification, the words "comprise" and "contain" and variants thereof mean "including but not limited to," and are not intended to exclude (and do not exclude) other fragments, additives, components, integers or steps. In this description, the singular includes the plural unless the context requires otherwise. In particular, when the indefinite article is used, the specification should be understood as encompassing plurality as well as singularity, unless the context requires otherwise.

Any features, integers, characteristics, compounds, chemical fragments or groups described in connection with a particular aspect, embodiment or example of the disclosure are to be understood as applicable to any other aspect, embodiment or example defined herein, unless inconsistent therewith. All of the features described in this description, and/or all of the steps of any method or process thus described, can be combined in any combination, with the exception of combinations in which at least some of these features and/or steps are mutually exclusive. The disclosure is not limited to the details of the aforementioned examples. The disclosure extends to any new feature or combination of features described in this description, or to any new step or combination of steps in any method or process thus described.

LIST OF REFERENCE NUMBERS

Clamp ring 102
Strap 104
Lever 106
Clip 108
Inner strand 110
Outer strand 112
Latch 114
First pivot point 116
Second pivot point 118
Notch 120
Clip hook 180
Strap hook 140
Breakaway connector 312
Clamp ring 202
Strap 204
Lever 206
Clip 208
Inner strand 210
Outer strand 212
Latch 214
First pivot point 216
Second pivot point 218
Notch 220
Strap hook 240
Radial or circumferential pitch of the strap hook 241
Strap hook portion 242
Strap hook portion 243
Strap ridge 244
Inner strap surface 245
Inner lever ridges 260
Clip hook 280
Radial or circumferential pitch of the strap hook 281
Clip hook portion 282
Clip hook portion 283
Reinforcement ridge 284
Lateral reinforcement ridge 285
Clamp ring 302
Tongue 391
Link 392
Ramp 393
Guide Wall 394

What is claimed is:

1. A clamp ring for fastening a pipe, the clamp ring comprising:
   a strap, a lever, and a clip,
   in which the strap is attached to the lever, and the lever attached to the clip,
   the clip being arranged to grip the strap, and, with the lever attached to the strap, the lever being arranged to push opposite ends of the strap towards each other,
   in which the clamp ring is made in a single piece, the strap, the lever and the clip being connected to each other by connectors,
   wherein the strap comprises an inner strand and an outer strand, wherein the inner strand has a first end and a second end opposite the first end, wherein the outer strand has a first end and a second end opposite the first end, wherein the first end of the inner strand is connected to the first end of the outer strand, wherein the second end of the inner strand is connected to the second end of the outer strand, and
   wherein the outer strand is longer than the inner strand.

2. The clamp ring according to claim 1, wherein at least one of the inner strand or the outer strand comprises one or more notches between the inner strand and the outer strand.

3. The clamp ring according to claim 2, wherein at least one notch is convex.

4. The clamp ring according to claim 2, wherein at least one notch is concave.

5. The clamp ring according to claim 2, wherein at least one matching notch is arranged on each of the outer strand and of the inner strand.

6. The clamp ring according to claim 2, wherein at least one concave notch is matched to at least one convex notch.

7. The clamp ring according to claim 1, further comprising a first connector at a first pivot point between the strap and the lever, and a second connector at a second pivot point between the lever and the clip.

8. The clamp ring according to claim 1, wherein the clip comprises a hook configured to engage a hook on the strap to grip the strap.

9. The clamp ring according to claim 8, wherein the hook of the clip and the hook of the strap each comprise a radial or circumferential pitch to inhibit lateral movement between the clip and the strap and optionally wherein the hook of the clip and the hook of the strap each comprise a pair of hook portions displaced at least one of radially or circumferentially relative to each other, so as to provide the radial or circumferential pitch.

10. The clamp ring according to claim 8, wherein the hook of the clip comprises a reinforcement ridge over at least part of its length.

11. The clamp ring according to claim 10, wherein the hook of the clip comprises a lateral reinforcement ridge perpendicular to the reinforcement ridge over at least part of its length.

12. The clamp ring according to claim 1, wherein the strap comprises a ridge protruding from an inner surface of the strap over at least part of a length of the strap to engage onto an outer surface of a pipe to which the clamp ring is fastened.

13. The clamp ring according to claim 1, wherein the strap comprises one or more links connecting the inner strand to the outer strand.

14. The clamp ring according to claim 1,
   wherein the strap comprises a latch arranged to stop a movement of the lever when the clamp ring is placed in a closed position.

15. A clamp ring for fastening a pipe, the clamp ring comprising:
   a strap, a lever, and a clip,
   in which the strap is attached to the lever, and the lever attached to the clip,
   the clip being arranged to grip the strap, and, with the lever attached to the strap, the lever being arranged to push opposite ends of the strap towards each other,
   in which the clamp ring is made in a single piece, the strap, the lever and the clip being connected to each other by connectors,
   wherein the strap comprises a tongue arranged to at least one of guide or hold the clip.

16. The clamp ring according to claim 15, wherein the tongue comprises a guide wall.

17. The clamp ring according to claim 15, wherein the tongue comprises a ramp.

* * * * *